US008539444B2

(12) United States Patent
Cao et al.

(10) Patent No.: US 8,539,444 B2
(45) Date of Patent: Sep. 17, 2013

(54) SYSTEM AND METHOD FOR PLATFORM-INDEPENDENT, SCRIPT-BASED APPLICATION GENERATION FOR SPREADSHEET SOFTWARE

(75) Inventors: Rong Zeng Cao, Beijing (CN); Wei C R Ding, Beijing (CN); Shun Jiang, Beijing (CN); Juhnyoung Lee, Yorktown Heights, NY (US); Chun Hua Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1280 days.

(21) Appl. No.: 12/164,582

(22) Filed: Jun. 30, 2008

(65) Prior Publication Data
US 2009/0328010 A1    Dec. 31, 2009

(51) Int. Cl.
*G06F 9/44* (2006.01)
(52) U.S. Cl.
CPC ........................................ *G06F 9/44* (2013.01)
USPC .......................................... 717/115; 717/136
(58) Field of Classification Search
None
See application file for complete search history.

(56) References Cited

U.S. PATENT DOCUMENTS

| | | | |
|---|---|---|---|
| 5,737,494 A | 4/1998 | Guinta et al. | |
| 5,918,232 A | 6/1999 | Pouschine et al. | |
| 5,946,694 A | 8/1999 | Copeland et al. | |
| 6,011,559 A | 1/2000 | Gangopadhyay et al. | |
| 6,023,578 A | 2/2000 | Birsan et al. | |
| 6,119,149 A | 9/2000 | Notani | |
| 6,161,101 A | 12/2000 | Guinta et al. | |
| 6,212,530 B1 | 4/2001 | Kadlec | |
| 6,292,830 B1 | 9/2001 | Taylor et al. | |
| 6,332,130 B1 | 12/2001 | Notani et al. | |
| 6,339,838 B1 | 1/2002 | Weinman, Jr. | |
| 6,411,936 B1 | 6/2002 | Sanders | |
| 6,556,974 B1 | 4/2003 | D'Alessandro | |
| 6,601,233 B1 | 7/2003 | Underwood | |
| 6,789,252 B1 | 9/2004 | Burke et al. | |
| 6,919,910 B2 | 7/2005 | Chang | |
| 6,928,436 B2 | 8/2005 | Baudel | |
| 6,954,758 B1 | 10/2005 | O'Flaherty | |
| 6,965,868 B1 | 11/2005 | Bednarek et al. | |

(Continued)

OTHER PUBLICATIONS

Visual Studio Tools for Office: Using Visual Basic 2005 with Excel, Word, Outlook, and InfoPath, by Eric Carter et al., Pub. Date: Apr. 26, 2006, Publisher: Addison-Wesley Professional, ISBN: 0-321-41175-7.*

(Continued)

*Primary Examiner* — Jay Morrison
(74) *Attorney, Agent, or Firm* — Scully, Scott, Murphy & Presser, P.C.; William Stock, Esq.

(57) ABSTRACT

A script-based application generation for spreadsheet software reads from one or more spreadsheets rendered by a spreadsheet program, description written in said text-based language, the text-based language for describing user interfaces, data models and/or workflow models or combinations thereof. The text-based language is independent of the spreadsheet program. The description is parsed and from the description one or more user interfaces, data model or workflow model or combinations thereof are generated in the spreadsheet program.

35 Claims, 8 Drawing Sheets

(56) References Cited

U.S. PATENT DOCUMENTS

| | | |
|---|---|---|
| 7,117,161 B2 | 10/2006 | Bruce |
| 7,136,827 B2 | 11/2006 | Eicher |
| 7,162,427 B1 | 1/2007 | Myrick et al. |
| 7,206,751 B2 | 4/2007 | Hack et al. |
| 7,246,128 B2 | 7/2007 | Jordahl |
| 7,251,613 B2 | 7/2007 | Flores et al. |
| 7,283,986 B2 | 10/2007 | Okunseinde et al. |
| 7,308,414 B2 | 12/2007 | Parker et al. |
| 7,415,437 B2 | 8/2008 | Marvin et al. |
| 7,503,032 B2 | 3/2009 | Bhaskaran et al. |
| 7,506,302 B2 | 3/2009 | Bahrami et al. |
| 7,574,694 B2 | 8/2009 | Mangan et al. |
| 7,584,117 B2 | 9/2009 | Bubner |
| 7,593,012 B2 | 9/2009 | Ikehata et al. |
| 7,605,813 B2 | 10/2009 | Uthe |
| 7,617,177 B2 | 11/2009 | Bukary et al. |
| 7,668,855 B2 | 2/2010 | Hodgson et al. |
| 7,693,738 B2 | 4/2010 | Guinta et al. |
| 7,885,841 B2 | 2/2011 | King |
| 7,925,594 B2 | 4/2011 | Jaligama et al. |
| 7,933,762 B2 | 4/2011 | Pinto et al. |
| 2001/0034628 A1 | 10/2001 | Eder |
| 2001/0049615 A1 | 12/2001 | Wong et al. |
| 2002/0099563 A1 | 7/2002 | Adendorff et al. |
| 2003/0004746 A1 | 1/2003 | Kheirolomoom et al. |
| 2003/0120372 A1* | 6/2003 | Ruth et al. .............. 700/108 |
| 2004/0059611 A1 | 3/2004 | Kananghinis et al. |
| 2004/0064436 A1 | 4/2004 | Breslin et al. |
| 2004/0078378 A1 | 4/2004 | Bala |
| 2004/0078777 A1 | 4/2004 | Bahrami |
| 2004/0143470 A1 | 7/2004 | Myrick et al. |
| 2005/0055677 A1* | 3/2005 | Nanja et al. ............. 717/136 |
| 2005/0065831 A1 | 3/2005 | Keay et al. |
| 2005/0119922 A1 | 6/2005 | Eder |
| 2005/0154769 A1 | 7/2005 | Eckart et al. |
| 2005/0171980 A1 | 8/2005 | Fernandez et al. |
| 2005/0203784 A1 | 9/2005 | Rackham |
| 2005/0246215 A1 | 11/2005 | Rackham |
| 2006/0015424 A1 | 1/2006 | Esposito et al. |
| 2006/0090129 A1* | 4/2006 | Collie et al. ............. 715/513 |
| 2006/0100947 A1 | 5/2006 | Cimral et al. |
| 2006/0129419 A1 | 6/2006 | Flaxer et al. |
| 2006/0178920 A1 | 8/2006 | Muell |
| 2006/0184412 A1 | 8/2006 | Kagan et al. |
| 2006/0190544 A1 | 8/2006 | Chikirivao et al. |
| 2006/0195373 A1 | 8/2006 | Flaxer et al. |
| 2006/0229926 A1 | 10/2006 | Homann et al. |
| 2006/0241956 A1 | 10/2006 | Levy et al. |
| 2007/0021993 A1 | 1/2007 | Chandra et al. |
| 2007/0022410 A1 | 1/2007 | Ban et al. |
| 2007/0027701 A1 | 2/2007 | Cohn et al. |
| 2007/0033211 A1 | 2/2007 | Berman et al. |
| 2007/0038465 A1 | 2/2007 | Jang et al. |
| 2007/0038501 A1 | 2/2007 | Lee et al. |
| 2007/0038502 A1 | 2/2007 | Kagan et al. |
| 2007/0038627 A1 | 2/2007 | Cohn et al. |
| 2007/0050232 A1 | 3/2007 | Chang et al. |
| 2007/0106520 A1 | 5/2007 | Akkiraju et al. |
| 2007/0118551 A1 | 5/2007 | Akkiraju et al. |
| 2007/0136115 A1 | 6/2007 | Doganaksoy et al. |
| 2007/0162482 A1 | 7/2007 | Flaxer et al. |
| 2007/0174109 A1 | 7/2007 | Cohn et al. |
| 2007/0179822 A1 | 8/2007 | Benayon et al. |
| 2007/0179825 A1 | 8/2007 | Dreiling et al. |
| 2007/0203766 A1 | 8/2007 | Adler et al. |
| 2007/0214025 A1 | 9/2007 | Jang et al. |
| 2007/0245297 A1 | 10/2007 | Kuester et al. |
| 2007/0250373 A1 | 10/2007 | Ernest et al. |
| 2007/0265864 A1 | 11/2007 | Chess et al. |
| 2007/0271277 A1 | 11/2007 | Ivan et al. |
| 2007/0279416 A1 | 12/2007 | Cobb et al. |
| 2008/0004924 A1 | 1/2008 | Cao et al. |
| 2008/0033888 A1 | 2/2008 | Flaxer et al. |
| 2008/0172273 A1 | 7/2008 | Rackham |
| 2008/0177622 A1 | 7/2008 | Akkiraju et al. |
| 2008/0313596 A1 | 12/2008 | Kreamer et al. |
| 2009/0006150 A1 | 1/2009 | Prigge et al. |

OTHER PUBLICATIONS

Microsoft Office Excel 2007 Visual Basic for Applications Step by Step, by Reed Jacobson, Pub. Date: May 16, 2007, Publisher: Microsoft Press, ISBN: 0-7356-2402-X, pp. 303-333.*

U.S. Office Action mailed Dec. 16, 2011 received in related U.S. Appl. No. 12/243,898.

U.S. Office Action mailed Dec. 22, 2011 in related U.S. Appl. No. 12/243,811.

Merino et al., Task-at-hand interface for change detection in stock market data, ACM, 1-59593-353-0-06-005, AVI 06, Venezia, Italy, May 23-26, 2006.

Chintalapani et al., Extending the Utility of Treemaps with Flexible Hierarchy, Archives-org, 2005.

Shneiderman, Treemaps for space-constrained visualization of hierarchies, archives-org, Mar. 21, 2007.

U.S. Official Action mailed Mar. 13, 2012 in related U.S. Appl. No. 12/243,872.

Ernest et al., Adding value to the IT organization with the Component Business Model, IBM Systems Journal, 2007, vol. 46, No. 3.

Lee et al., Value-Centric, Model-Driven Business Transformation, CEC-EEE '06 Proceedings of the 8th IEEE International Conference on E-Commerce Technology and the 3rd International Conference on Enterprise Computing, E-Commerce and E-Services, IEEE Computer Society Washington DC, ISBN 0-7695-2511-3.

Li et al., Continual Business Transformation Technology, International Federation for Information Processing, vol. 205, Research and Practical Issues of Enterprise Information Systems, eds. Tjoa, A.M., Xu, L., Chaudhry, S., (Boston: Springer), pp. 85-95.

Office Action dated Jun. 29, 2011 received in related U.S. Appl. No. 12/243,891.

Office Action dated Jul. 19, 2011 received in related U.S. Appl. No. 12/243,851.

Office Action dated Jul. 5, 2011 received in related U.S. Appl. No. 12/243,811.

Office Action dated May 20, 2011 received in related U.S. Appl. No. 12/243,872.

Microsoft Office Project Server 2007, 2006 Microsoft Corporation, http://download.microsoft.com/download/e/b/9/eb9e67aa-ae8c-4cc4-aad8-9e352f92c28c/ProjectPortfolioServer2007ProductGuide.doc.

Microsoft Office Project Portfolio Server 2007 Optimizer, https://www.am.ohio.gov/PortfolioServer/Manuals/MOPPSOptimizer.pdf.

Balzer et al., Voroni Treemaps for the Visualization of Software Metrics, Association for Computing Machinery Inc., 2005.

Bederson et al., Ordered and Quantum Treemaps Making Effective use of 2D Space to Display Hierarchies, Institute of Advanced Computer Studies, College Park, MD, ACM, 2002.

Bladh, Step Tree, A File System Visualizer, Thesis No. MSC-2002-3, Department of Software Engineering and Computer Science, Blekinge Institute of Technology, Sweden, 2002.

Hodgson, Squarified Treemaps in XAML and C sing Microsoft Longhorne, the Code Project, 2002.

Heat Map, http://en.wikipedia.org/wiki/Heat_map.

Office Action dated Jun. 23, 2011 received in related U.S. Appl. No. 12/243,898.

Pentapalli, A Comparative Study of Roth-Erev and Modified Roth-Erev Reinforcement Learning Algorithms for Uniform-Price Double Actions, Iowa State University, 2008.

Brown et al., Treemap 97, 1997, Retrieved from http://otal.umd.edu/Olive/Class/Trees.

Cable et al., Project Portfolio Earned Value Management Using Treemaps, Project Management Institute Research Conference, Jul. 2004.

Johnson et al., Tree-Maps a Space-Filling Approach to the Visualization of Hierarchical Information Structures, IEEE CH3046-09100000284, 1991.

Jungmeister et al., Adapting Treemaps to Stock Portfolio Visualization, University of Maryland, Institute for System Research, Nov. 1992.

North et al., Snap-Together Visualization—Coordinating Multiple Views to Explore Information, HCIL Technical Report 99-10, May 1999.

Shneiderman, Discovering Business Intelligence Using Treemap Visualizations, Beyey Network, Apr. 2006.

Shneiderman, Tree Visualization with Tree-Maps—A 2-D Space-Filling Approach, University of Maryland, 1991.

Songer, Multidimensional Visualization of Project Control Data, Construction Innovation, 4, 173-190, 2004.

Office Action dated Oct. 11, 2011 received in related U.S. Appl. No. 12/243,872.

U.S. Office Action mailed Aug. 17, 2012 received in related U.S. Appl. No. 12/243,872.

* cited by examiner

Tree Structure Approach to describe the UI — 202

Interpreter to generate the
UI components at runtime

Available widgets to support in description script language
(Eclipse SWT widgets)

Browser    Button (SWT.ARROW)    Button (SWT.CHECK)

Button (SWT.RADIO)

Button (SWT.PUSH)

DateTime    Label    Tree

Text (SWT.SINGLE)    Table

Text (SWT.MULTI)

List    Combo    Group

SYSTEM AND METHOD FOR PLATFORM-INDEPENDENT, SCRIPT-BASED APPLICATION GENERATION FOR SPREADSHEET SOFTWARE

FIELD OF THE INVENTION

The present disclosure relates generally to computer applications, and more particularly to platform-independent, script-based application generation for spreadsheet software.

BACKGROUND OF THE INVENTION

Spreadsheet applications such as Microsoft Excel™, Lotus 1-2-3™, Google™ Spreadsheets, and Open Office Calc™ are widely employed, and especially, their use in the financial industry is prevalent. Those applications often provide a natural programming platform for the users with simple user interface (UI) programming and programming interface including built-in languages like VBA (Visual Basic for Application) and external development interface like Microsoft VSTO (Visual Studio Tools for Office). Despite such utilities, however, in order to integrate complex data models and associated user interfaces (UIs) requiring data input, transformation, validation, and management functionalities, additional programming or integrating effort must be expanded, which to a non-professional programmer may pose a daunting task. Moreover, spreadsheet extension development environment (e.g., Visual Studio Tool for Office) are platform and product dependent, which means that a user programming on such environments must learn and be familiar not only with one but also several different ways of programming. For example, VBA program written for Excel™ and stored in a separate program workspace cannot work for Lotus 1-2-3™ or Google™ Spreadsheets.

Accordingly, it would be desirable to provide a user interface, data model, and/or process description language that is spreadsheet-friendly and support process, and data management, and also are easy to use and understand. It would be also desirable to provide an interpreter of the language, which is independent of the platform, spreadsheet product and programming language.

BRIEF SUMMARY OF THE INVENTION

A method and system for platform-independent, script-based application generation for spreadsheet software are provided. The method in one aspect may comprise reading from one or more spreadsheets rendered by a spreadsheet program, description written in the text-based language. The text-based language has constructs for describing user interfaces, data models and/or workflow models, or combinations thereof The text-based language is written independently of the spreadsheet program. The method may also include parsing the description, and generating one or more user interfaces, data model or workflow model or combinations thereof from the parsed description. The user interfaces, data model or workflow model or combinations thereof are generated in the spreadsheet program.

A method for platform-independent, script-based application generation for spreadsheet software, in another aspect, may comprise providing a text-based language for describing user interfaces, data models and/or workflow models, or combinations thereof, text of the text-based language being enterable in one or more spreadsheets of a spreadsheet program. The text-based language is written independent of the spreadsheet program. The method may also include providing an interpreter that parses the text and translates the text into programming instructions in a language native to the spreadsheet program. The programming instructions are for generating one or more user interfaces, data models or workflow models or combination thereof specified by the text. The one or more user interfaces, data models or workflow models or combination thereof are generated and presented in the spreadsheet program.

A system for platform-independent, script-based application generation for spreadsheet software, in one aspect, may comprise a text-based language for describing user interfaces, data models and/or workflow models, or combinations thereof, text of the text-based language being enterable in one or more spreadsheets of a spreadsheet program. The text-based language is written independently of the spreadsheet program. An interpreter parses the text and translates the text into programming instructions in a language native to the spreadsheet program. The programming instructions are for generating one or more user interfaces, data models or workflow models or combination thereof specified by the text. The one or more user interfaces, data models or workflow models or combination thereof are generated and presented in or by the spreadsheet program.

A program storage device readable by a machine, tangibly embodying a program of instructions executable by the machine to perform the above methods may be also provided.

Further features as well as the structure and operation of various embodiments are described in detail below with reference to the accompanying drawings. In the drawings, like reference numbers indicate identical or functionally similar elements.

DETAILED DESCRIPTION

Figures 1, 1A:
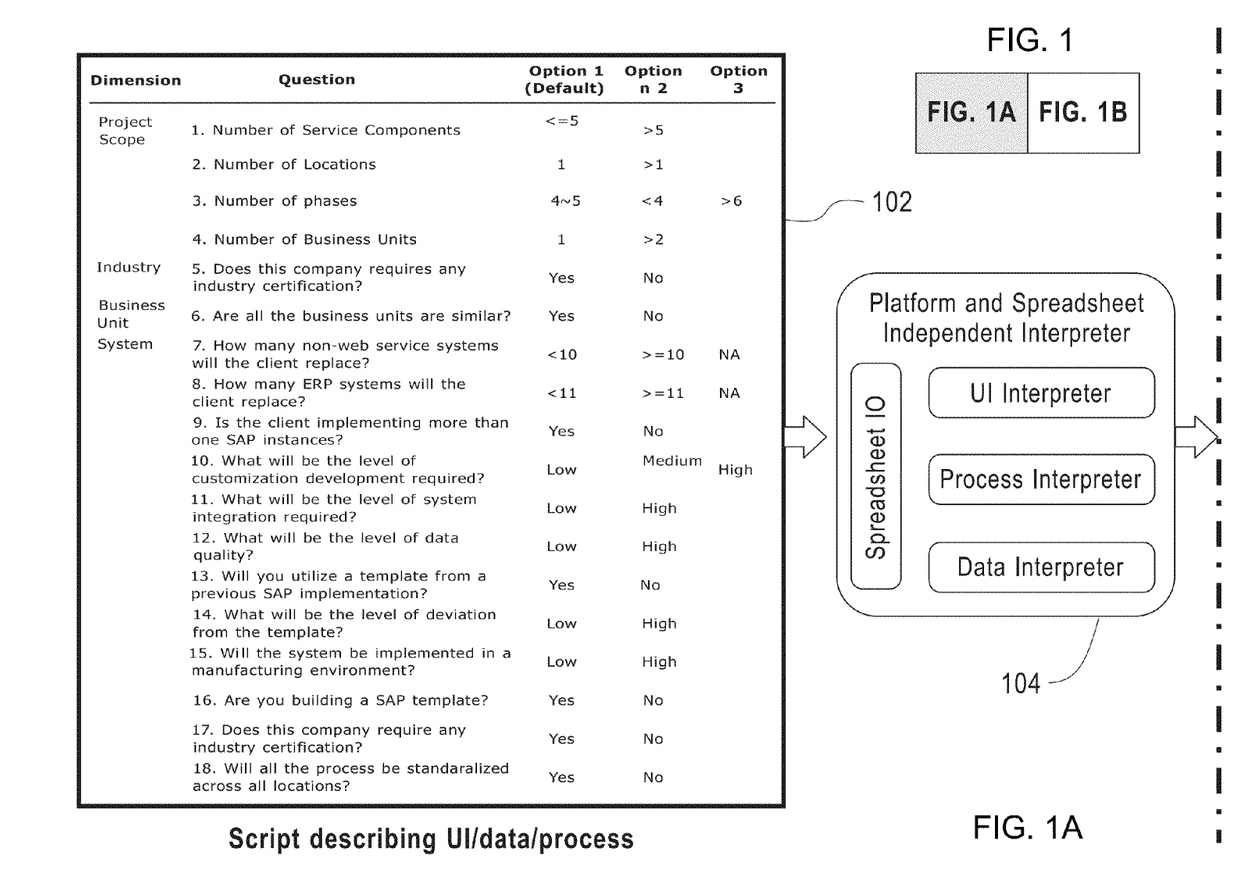
FIG. 1 is an overview diagram illustrating spreadsheet friendly language of the present disclosure in one embodiment.
Figures 1, 1B:
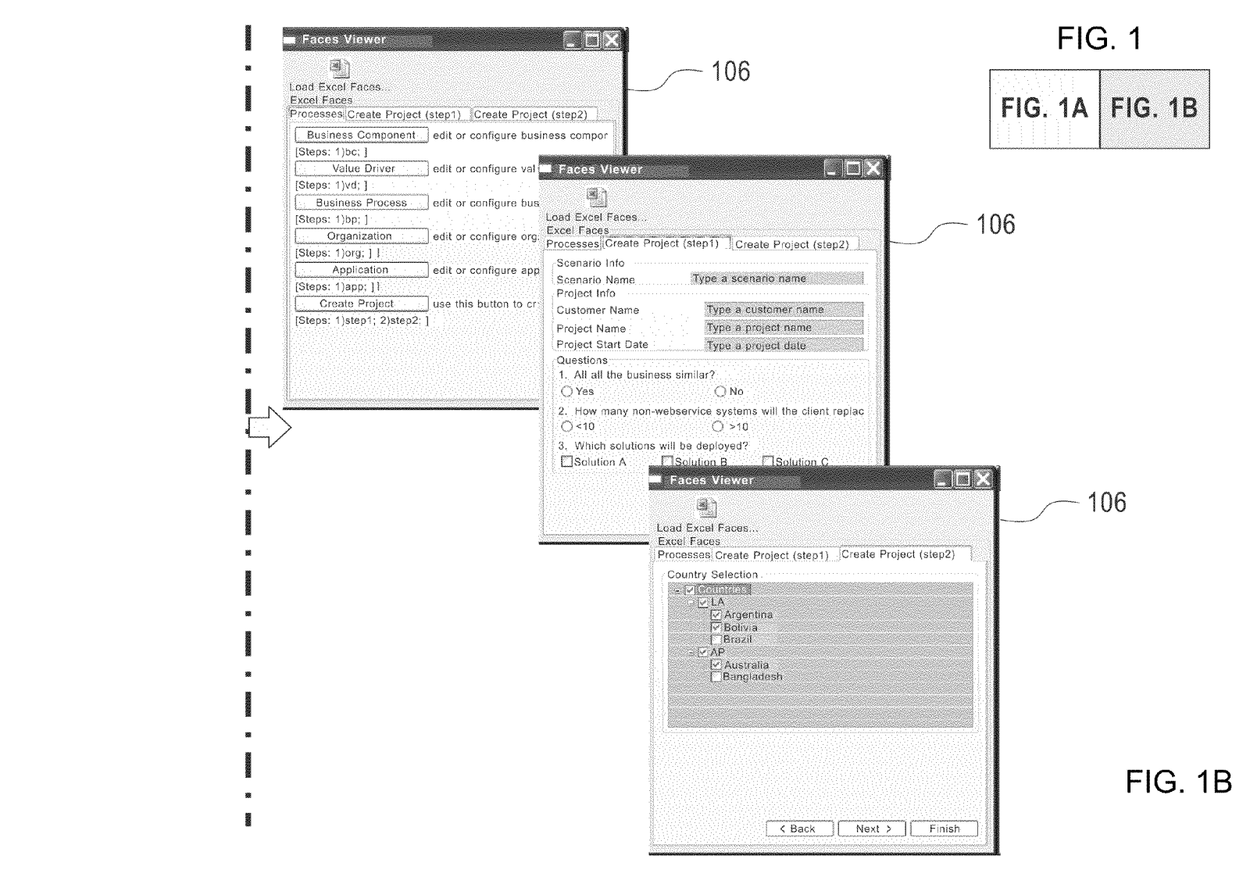

FIG. 1 is an overview diagram illustrating spreadsheet friendly language of the present disclosure in one embodiment. The user writes user interface (UI) and process by entering description data into a spreadsheet application as shown at 102, and stores the description in one or more spreadsheets. For instance, the user may write a program, i.e., "script" program, which comprises a set of text, and which commands the generation of user interface such as forms on a spreadsheet such as Excel™ (for example, a form-based program having one or more pop-up windows with buttons and other controls in them), data passing among them, workflow enforcement among them with buttons and other controls. The script language of the present disclosure provides simple way for business users to generate, manipulate and process user interfaces. In one aspect, a set of text, also referred to as spreadsheet script, is provided that users can directly input in the spreadsheet cells. The set of text allows the user to define the UI of the application. The table structure in spreadsheet can be used to organize tree-like data in one sheet. The spreadsheet elements shown in FIG. 2 at 202, FIG. 3 at 302 and FIG. 4 at 408 illustrate examples of this table structure where data is organized in a tree-like format or structure, for example, data in column A is a parent of data in column B, data in column B is a parent of data in column C, and so forth. Those elements show that the commands for the user interface generation, data passing among them, and workflow among them (using buttons, etc.) can be structured in a hierarchical format. The system and method of the present disclosure utilize the table structure to build the script programs in tree format in spreadsheets. The program is embedded and/or stored in spreadsheets instead of some other programming workspace, unlike other programs such as VBA, and so the script program can be easily ported to other spreadsheet programs.

Figure 3:
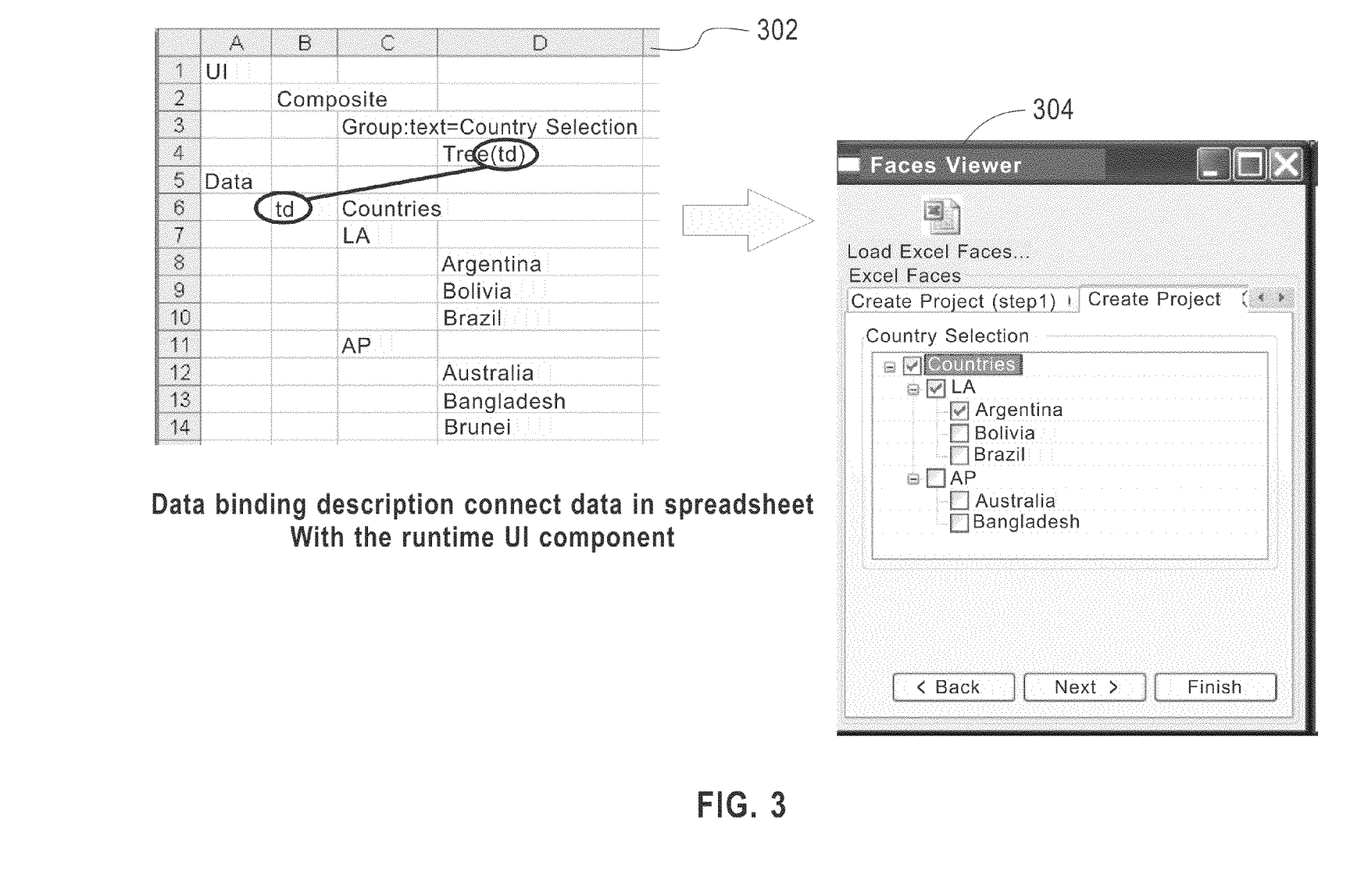
FIG. 3 illustrates data binding to connect data source with UI component.

An interpreter 104 is provided that loads the spreadsheet file and parse the data in the sheets. The interpreter 104 parses the description stored in one or more spreadsheets and generates user interfaces 106 with data accordingly, which enforce prescribed processes defined in spreadsheets, e.g., questionnaire. The interpreter 104 generates the UI as defined or commanded by the user via the set of text in the spreadsheet. The data defined in the spreadsheet is loaded to fill the UI components as defined in data binding mechanism. An example of data binding is shown in FIG. 3. In 302, the script says that this describes a UI (in row 1, column A) and Data (in row 5, column A) that is bound to the UI. The UI describes a group of text labeled "Country Selection" (in row 3, column C). It also describes that it contains a tree of data labeled "td" (in row 4, column D). Then the Data section (starting row 5) the data tree known as "td" (row 6, column B) comprises of Countries (row 6, column c) enumerated starting row 7, column D. For example, LA (Latin America) comprising Argentina, Bolivia, etc., AP (Asia Pacific) comprising Australia, Bangladesh, etc. as shown in the spreadsheet 302. The spreadsheet provides a convenient medium for storing UI piece of program and Data piece (e.g., tree of countries and continents) as well as serving as a program or script that is interpreted and rendered into the UI. The processes defined in the spreadsheet triggers a wizard like mechanism to guide users to finish the work along with the processes defined. Examples of the wizard like mechanism are the small pop-up windows (or forms) shown in FIG. 4.

In one embodiment, Interpreter 104 of the present disclosure runs or functions independently of the specific spreadsheet program. The interpreter 104 may be written in Java™ or other languages such as VisualBasic™, JavaScript™, Python™, Perl™, C++, C, or other language. The interpreter 104 can be used for different spreadsheet programs as long as they have columns and rows, which is given by definition of spreadsheets.

The interpreter 104 understands the script language constructs described in the examples shown in the figures. Also, the interpreter 104 understands the structure of the script programs stored in spreadsheets. When a script program 102 is submitted to the interpreter 104, the interpreter 104 understands the commands in the program and translates them into language constructs that the spreadsheet software where the program is run understands, e.g., the interpreter 104 may translate the text program into VBA™ for Excel™ spreadsheet software. Then the spreadsheet generates the UI, data, and workflow with widgets as the script commands. In one aspect, the interpreter 104 may function on top of languages native to spreadsheet software. So, it is possible to write an interpreter, which understands a script program for each spreadsheet software, i.e., one for Excel™, another for Lotus™, and another for Google Spreadsheets. Once the interpreter is installed, the same script program can run on different spreadsheet software, e.g., Excel™, Lotus™, Google Spreadsheets and Open Office Suite.

Working results may be saved back to one or more spreadsheets, and the user can view them and manually modify the values as necessary directly on the spreadsheets. For instance, user input in the application may be stored back to spreadsheet so the user can open the spreadsheet in native product and continue with the work. For example, the data input to the forms, for instance, a specific Scenario name typed in by a user, a selection of radio button, a selection of check box, etc. may be saved in a worksheet, for example as a script text in another worksheet. Saving the scripts in worksheets helps the independence of the script programs from the spreadsheet programs.

The interpreter 104 understands the script language constructs and the structure of the script programs stored in spreadsheets. When a script program 102 is submitted to the interpreter 104, it understands the commands in the program and translates them into languages constructs that the spreadsheet software where the program is run understands, e.g., VBA™ in case of Excel™. Then the spreadsheet generates the UI, data, and workflow with as the script commands. In a sense, the interpreter sits on top of languages native to spreadsheet software. An interpreter that understands the script program may be written for each spreadsheet software program, e.g., one for Excel™, another for Lotus™, and another for Google™ Spreadsheets. Once the interpreter is installed, the same script program can run on different spreadsheet software, e.g., Excel™, Lotus™, Google Spreadsheets and Open Office Suite.

Figure 2:
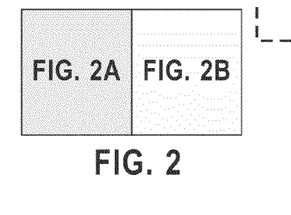
FIG. 2 illustrates a tree structure approach to user interface definition and interpretation in one embodiment of the present disclosure.
Figures 2, 2B:
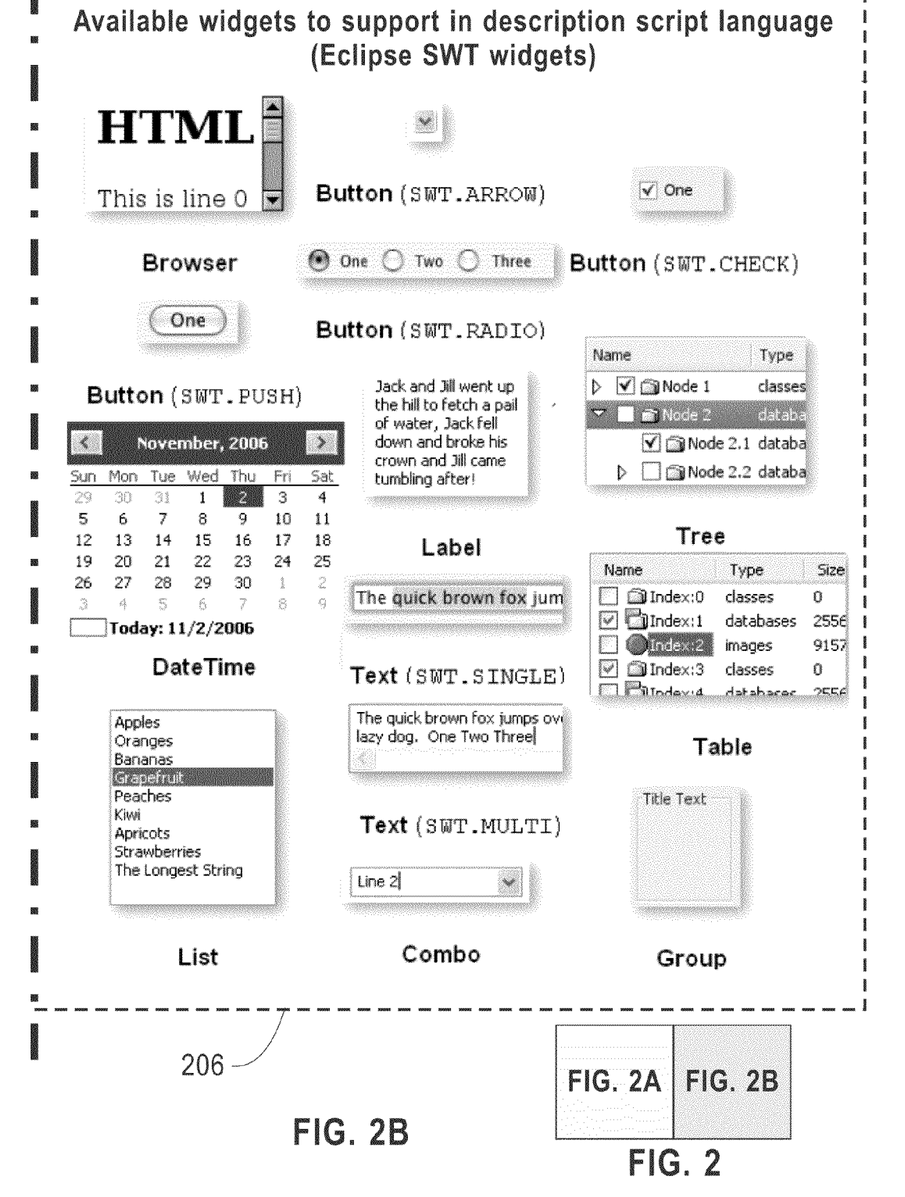
Figure 2A:
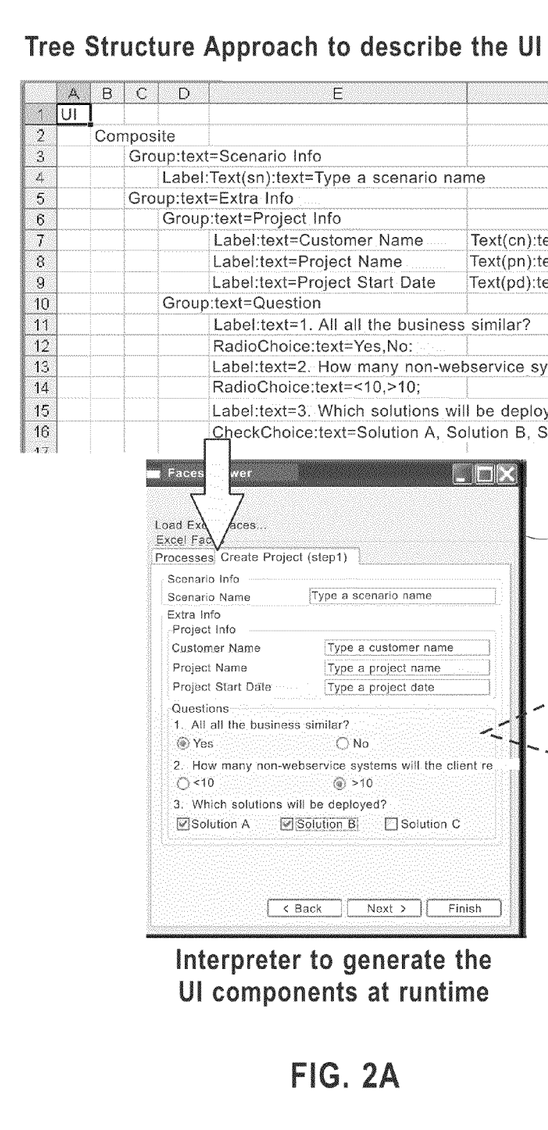

FIG. 2 illustrates a tree structure approach to user interface definition and interpretation in one embodiment of the present disclosure. The text script or the command text that the user can enter into a spreadsheet program, for instance, that describes UI to be built, in one embodiment adopt a tree structure approach as shown at 202. This approach is very friendly in spreadsheet environment. For instance, item or content of each row in the spreadsheet may represent a node in a tree, and each column (A, B, C, D, E, F, etc. shown at 202) in the spreadsheet may represent a different level of hierarchy for that node in a tree structure. Thus, "UI" shown in column A is a parent of "Composite" shown in column B, "Group: text=Scenario info" shown in column C is a child of "Composite", and so forth.

For example, the language construct at 202 generates the graphical widgets shown at 204 in FIG. 2. For instance, take 202 and 204. Column A, row 1 at the top of 202 tells that the script is for generating a UI. Column B, row 2 language tells that it is a combination of multiple tabs ("composite"). Then it describes elements in a tab. The first element is a group of text with label "Scenario Info". The group also contains a space for text typing with default text of "Type a scenario name." The example goes on. Later elements in this figure show graphical widgets such as radio buttons and check boxes (e.g., column E, rows 12, 14 and 16 of FIG. 2 at 202).

In the example shown at 202, the group element in column C, row 3 is labeled "Scenario Info." It contains a text space labeled "Scenario Name" as shown at column D, row 4, and a default text, "Type a scenario name." In column C, row 5, another group element labeled "Extra Info" has two group element children, one labeled "Project Info" and the other labeled "Question." The Project Info contains three text entering spaces labeled "Customer Name," "Project Name," and "Project Start Date." The other text group element, "Question" has three questions. The first two questions provide radio buttons for the user's selection. The last one provides check boxes for the user's selection. The graphical widgets in the UI corresponding the commands in the script 202 are displayed in 204. Examples of graphical widgets and UI components are shown at 206.

In one embodiment, there are two types of UI components that are used to construct the UI. One type is called container widget, another other type is called non-container widget. Examples of container widgets include but are not limited to, Group, Composite, etc. The non-container widgets include but are not limited to, Label, Text, Button, etc.

As an example, the system and method may be built on or utilizing the existing Eclipse SWT widgets technology (Java™ based), and use Group and Composite in Eclipse SWT widgets as container widgets, and many of the widgets provided by Eclipse SWT, like Label, Text, Button, Tree, Table, Browser, etc. An interpreter may be built on Eclipse in Java™ programming language and run on Excel™, for example. The interpreter may be programmed to understand the Eclipse SWT widgets such as those shown in FIGS. 2, 3 and 4, and translate into corresponding UI widgets in spreadsheet program such as Excel™. Those widgets are typically used in many computer program user interfaces. The interpreter may be programmed to handle all if not most of the UI graphical widgets that are available.

FIG. 3 illustrates data binding to connect data source with UI component. In one embodiment, data binding mechanism includes two steps: 1) The approach to define the data model; and 2) The approach to define the data binding between data and UI widgets such as buttons, label, menu, window, icon, etc. In one aspect, a tree structure approach is used to define the data model, which can organize tree-oriented data, table oriented data and basic list oriented data. In this approach, the root tree node is used as a key to indicate the data source that could be bound into UI widgets. FIG. 3 at 302 shows two sections: one for UI and the other for data. These two parts are bound together through a key, "td." The UI script describes that the widget is a text group comprised of a tree, but the data is not shown in the UI portion of the script. Rather, the UI portion shows where the interpreter can find the data—by using the key, "td." The Data portion of the script labeled "td" shows the details of the data as shown in a hierarchical structure by using the spreadsheet table, comprised of continents and countries. The check boxes shown in the UI at 304 is additional detail not shown in the script 302, but can be added as necessary.

Figure 4:
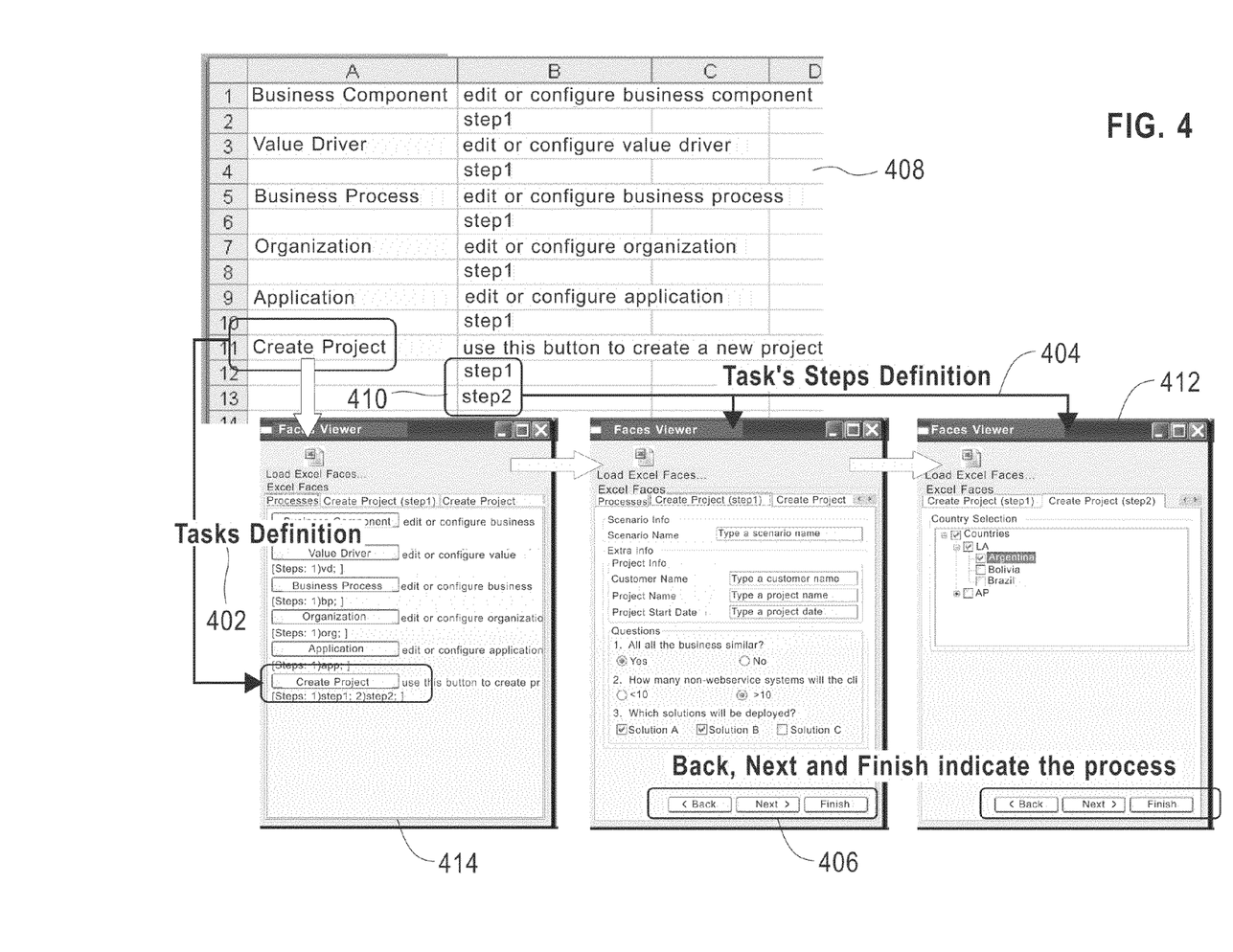
FIG. 4 illustrates process description to support workflow management.

FIG. 4 illustrates process description to support workflow management and work flow model. The processes define the steps to finish a work. Each step may be displayed as a wizard page, i.e., in a pop-up window to indicate the workflow to users. In this figure, the script 408 shows an example of workflow specification. Each entry in the script in column A ("Business Component," "Value Driver," etc.) is described to be in the first pop-up window, i.e., the "Step 1" window. The script also says that the next step is described as "Step 2." Therefore, the "Next" button 406 in the Step 1 window will spawn the Step 2 window, and the "Back" button 406 in the Step 2 window will take it back to the Step 1 window. The interpreter that interprets the process workflow text or script 408 may be built to have semantics that follow this procedure of navigating through widgets when Step x in the text or script is read or interpreted. Note that the script for the Step 2 and 3 windows is not shown in this figure.

The description or text language of the present disclosure supports sequence based workflow. The sequence-based workflow defines the steps that users follow to complete a task. In a sequence-based workflow, one or more steps may need to be taken before other steps, e.g., so one or more prerequisites can be determined along with the workflow. The workflow can be used to organize the sequence of user interfaces which could make the tool more user-friendly. In the script spreadsheet, users can follow the standard of the script language to define the steps of each workflow. The first column could be used to define different tasks users can take, and then the second column could be used to define the steps of each task.

Referring to FIG. 4, at 408, the entries in column A show examples of the actions the user can take with its annotation. The actions may be implemented as buttons in the user interface, e.g., pop-up windows as illustrated at 402. The entries in column B (other than the annotation to actions), e.g., Step 1, Step 2, etc., represent the workflow as illustrated at 404, that is, which pop-up window this particular action will be on. Note that Step 2 entered below Step 1 (illustrated at 410) may indicate that the second window 406 displays UI of what is described with Step 2. Thus, Step 2 in the script may correspond to second window shown at 406 and Step 3 (not shown in the script at 408) may correspond to third pop-up window at 412, and so forth. The interpreter that reads and parses the text or script 408 has semantic rules that would understand the flow. In one aspect, the interpreter has this information or follows its semantic rules in reading and parsing the script as to the actions to perform based on the script. For example, actions from workflow from the script structure (i.e., columns A and B), content of Step 1, Step 2, Step 3 windows (414, 406, 412), which window to pop-up when the "Next" button of Step 1 window 414 is pressed, which window to display when the "Back" button in Step 2 window 406 is pressed and other information may be encoded into the interpreter program so that those details do not have to be programmed every time by the writer of the script program. How much information to encode into the interpreter is a design choice, for example, depending how complex or simple the semantics of the interpreter should be for the users or writers of the script language. As shown in FIG. 4, workflow model may include graphical widgets and windows created from the script that guides or allows a user to navigate through those widgets and windows.

Figure 5:
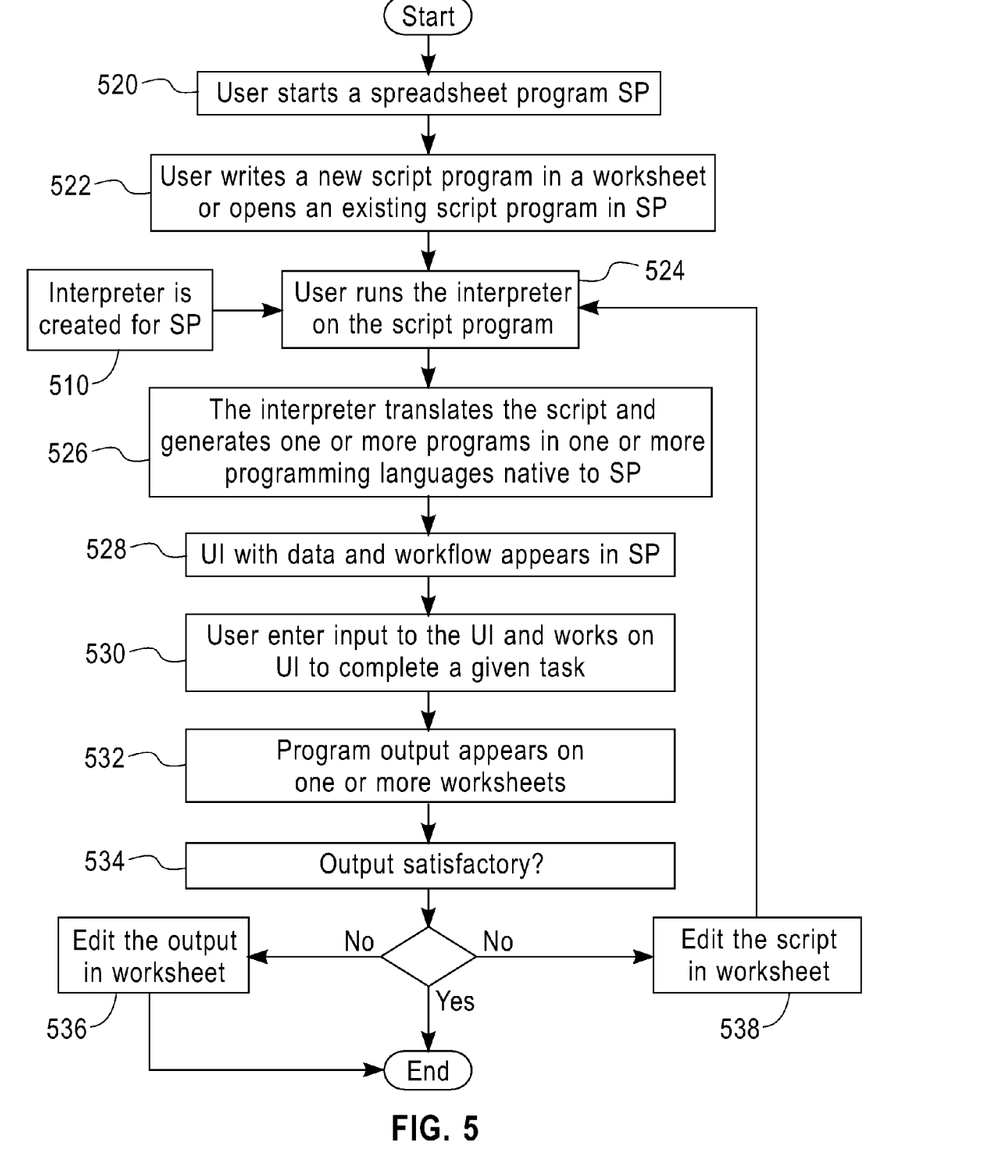
FIG. 5 is a flow diagram illustrating a method for platform-independent, script-based application generation for spreadsheet software.

FIG. 5 is a flow diagram illustrating a method for platform-independent, script-based application generation for spreadsheet software. The method of the present disclosure in one embodiment creates and runs one or more sophisticated computer programs comprising one or more user interfaces with data structures and workflow (e.g., shown in FIG. 1 at 102), beyond the typical use of spreadsheet programs in storing tables of numbers and other data for calculations. The method utilizes one or more computer language interpreter (e.g., shown in FIG. 1 104) or like designed for understanding spreadsheet-based script language and translating programs written in the language to one or more program languages native to a specific spreadsheet program where the script program is executed. To execute such script programs on specific spreadsheet software, one or more script interpreter may be written for the spreadsheet software, for example as shown at 510 (FIG. 5). The interpreter does not have to be written in a language the spreadsheet software understands. However, the interpreter is written in a way that a script program can be translated into one or more languages understood by the spreadsheet software.

Referring to FIG. 5, once the interpreter is ready, the user starts the spreadsheet software at 520 to create and run one or more script programs at 522. Alternatively or additionally, there may be one or more existing script programs written previously on this spreadsheet software or other software. In the case in which a script program has already been written, the user opens the existing script program in one or more worksheets. Additionally, the user can edit the script program as necessary for execution.

Once the script program (e.g., shown in FIG. 1 at 102) is ready to be executed, the user runs the interpreter on the script program at 524. The interpreter (e.g., shown in FIG. 1 at 104) translates the script program and generates one or more programs in one or more computer programming languages native to the specific spreadsheet software where the interpreter is running at 526. The spreadsheet software understands the translated or generated program from the script program, and thus the commands initially issued from the script program. The spreadsheet software executes the translated program which in turn generates one or more user interfaces with data bound to one or more user interface fields or components, and workflow specified in the script program at 528.

As in ordinary task execution in any computer program, the user now goes through the generated user interfaces, reviewing questions and data shown in the user interfaces, entering data input requested by the user interfaces and following the steps guided by the user interfaces at 530. All the views and activities provided in the user interfaces are those that are specified in the script program. Once all the steps specified in the generated user interfaces are followed, output of the script program is generated and stored in one or more worksheets in the spreadsheet software at 532. For instance, the generated program that is native to the spreadsheet software can include program instructions to save or store the outputs of the script program in one or more separate worksheets.

The user may review the output as written out to the worksheet to check that it is satisfactory. If the output is not satisfactory to the user, there may be possible actions that can be taken. First, the user can review the output in worksheets and directly make changes in the worksheets at 536. The other action is, instead of editing the results; the user can edit the script program at 538. It is as easy as editing the output worksheets, because the script program is also stored in one or more worksheets. Once the script program is modified, it is resubmitted to the interpreter and the user follows the steps again from step 524.

Figure 6:
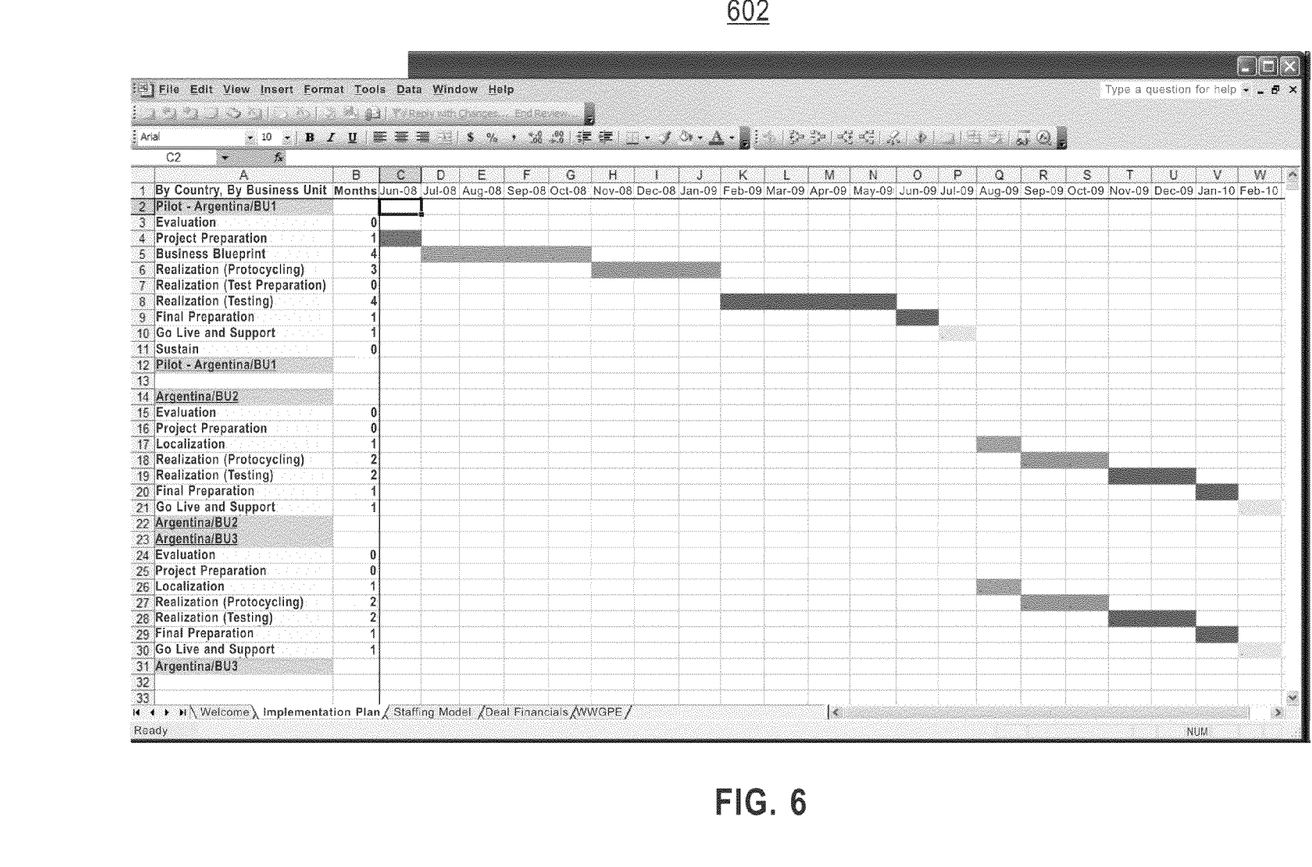
FIG. 6 is an example of an output data in a spreadsheet worksheet.

An output written to the worksheet comprises data. Depending on the input and logic of the script program 102, the output may be in the form of anything that can be shown in worksheets in the spreadsheet program. FIG. 6 shows an example of an output in a spreadsheet. This example 602 happens to show a Gantt chart for a project. It shows a few rollout plans determined by country and business units and displays a Gantt chart for each rollout with several phases given by the particular project management method used in the project. This output is data that is compatible with the spreadsheet program and can be shown in a worksheet, and may be modified by the user as desired as explained in FIG. 5 at step 536 with no connection to the script program which generated the output. For example, the user may manipulate the data using the spreadsheet program independently of the script program that generated the output.

Developing the interpreter and script constructs as described in this disclosure is well within the skills of a person having ordinary skill in computer languages, compiler and interpreter technology. Therefore, details are not provided herein. For example, "Compilers: Principles, Techniques, and Tools" by Alfred V. Aho, Monica S. Lam, Ravi Sethi, Jeffrey D. Ullman provides a comprehensive description of programming language compilers and constructs.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for platform-independent, script-based application generation for spreadsheet software, comprising:

reading from one or more spreadsheets rendered by a spreadsheet program, description written in text-based language, the text-based language for describing user interfaces, data models, or workflow models or combinations thereof, the text-based language being independent of the spreadsheet program, the description input directly into row and column cells of the one or more spreadsheets;

parsing the description;

translating the parsed description into programming instructions in a language native to the spreadsheet program;

generating one or more user interfaces, data models or workflow models or combinations thereof from the parsed description; and presenting said one or more user interfaces, data models or workflow models or combination thereof in the spreadsheet program by executing the translated programming instructions in the spreadsheet program.

2. The method of claim 1, further including:

storing into said one or more spreadsheets user input or results or combination thereof, received from said user interface, data model or workflow model or combinations thereof.

3. The method of claim 1,
wherein the step of generating one or more user interfaces is performed by executing the programming instructions in the spreadsheet program.

4. The method of claim 1, wherein the text-based language has tree structure.

5. The method of claim 1, wherein the text-based language has tree structure; and
the step of parsing includes using row and column structure provided in said one or more spreadsheets.

6. The method of claim 1, wherein the text-based language has tree structure; and
the step of parsing includes using row and column structure provided in said one or more spreadsheets, wherein text entered in a column has a parent-child relationship with text entered in an adjacent column that succeeds or precedes the column.

7. The method of claim 1, wherein the description written in said text-based language specifies one or more widgets to be included in said one or more interfaces, data models or workflow models or combinations thereof.

8. The method of claim 1, wherein the description written in said text-based language specifies one or more steps for navigating through said one or more of user interfaces.

9. The method of claim 1, wherein the description written in said text-based language specifies one or more widgets to be included in said one or more interfaces, data models or workflow models or combinations thereof, and the description written in said text-base language further specifies data to be bound to one or more widgets.

10. A computer-implemented method for platform-independent, script-based application generation for spreadsheet software, comprising:
providing a text-based language for describing user interfaces, data models or workflow models or combinations thereof, text of the text-based language being enterable directly in row and column cells of one or more spreadsheets of a spreadsheet program, the text-based language being independent of the spreadsheet program; and
providing an interpreter that parses the text and translates the text into programming instructions in a language native to the spreadsheet program based on row and column cell structure provided by the spreadsheet program, the programming instructions for generating one or more user interfaces, data models or workflow models or combination thereof specified by the text, said one or more user interfaces, data models or workflow models or combination thereof being generated and presented in the spreadsheet program by executing the translated programming instructions in the spreadsheet program.

11. The method of claim 10, wherein the interpreter includes at least a user interface interpreter that parses the text for widgets to be built into said one or more user interfaces.

12. The method of claim 10, wherein the interpreter includes at least a process interpreter that parses the text for one or more process steps for navigating through said one or more user interfaces, data models or workflow models of combinations thereof.

13. The method of claim 10, wherein the interpreter includes at least a data interpreter that parses the text for one or more data to be bound to one or more widgets to be built into said one or more user interfaces, data models or workflow models.

14. The method of claim 10, wherein the text-based language has tree structure.

15. The method of claim 10, wherein the text-based language has tree structure; and
the interpreter parses data in row and column table structure provided in said one or more spreadsheets.

16. The method of claim 10, wherein the text-based language has tree structure; and
the interpreter parses data in row and column table structure provided in said one or more spreadsheets, wherein text entered in a column of said one or more spreadsheets has a parent-child relationship with text entered in an adjacent column that succeeds or precedes the column.

17. The method of claim 10, wherein the text written in said text-based language specifies one or more widgets to be included in said one or more interfaces, data models or workflow models or combinations thereof.

18. The method of claim 10, wherein the text written in said text-based language specifies one or more steps for navigating through said one or more of user interfaces, data models or workflow models or combinations thereof.

19. The method of claim 10, wherein the text written in said text-based language specifies one or more widgets to be included in said one or more interfaces, data models or workflow models or combinations thereof, and the text written in said text-base language further specifies data to be bound to one or more widgets.

20. The method of claim 10, wherein the interpreter further generates additional programming instructions for storing into said one or more spreadsheets user input or results or combination thereof, received from said one or more user interfaces, data model or workflow model or combinations thereof.

21. A computer-implemented system for platform-independent, script-based application generation for spreadsheet software, comprising:
a computer processor;
a text-based language for describing user interfaces, data models or workflow models or combinations thereof, text of the text-based language being enterable directly in row and column cells of one or more spreadsheets of a spreadsheet program, the text-based language being independent of the spreadsheet program; and
an interpreter, operable to execute on the computer processor, that parses the text and translates the text into programming instructions in a language native to the spreadsheet program based on row and column cell structure provided by the spreadsheet program, the programming instructions for generating one or more user interfaces, data models or workflow models or combination thereof specified by the text, said one or more user interfaces, data models or workflow models or combination thereof being generated and presented in the spreadsheet program by executing the translated programming instructions in the spreadsheet program.

22. The system of claim 21, wherein the interpreter further generates additional programming instructions for storing into said one or more spreadsheets user input or results or combination thereof, received from said one or more user interfaces, data model or workflow model or combinations thereof.

23. The system of claim 21, wherein the text-based language has tree structure and the interpreter parses data in row and column table structure provided in said one or more spreadsheets, wherein text entered in a column of said one or more spreadsheets is interpreted to have a parent-child relationship with text entered in an adjacent column that succeeds or precedes the column.

24. The method of claim 1, wherein the description written in said text-based language can be used without modifications on a plurality of different spreadsheet program platforms.

25. The method of claim 1, wherein the description written in said text-based language can be used without modifications on a plurality of different spreadsheet program platforms, the description being translated into a plurality of different programming languages native respectively to the plurality of different spreadsheet program platforms.

26. The method of claim 1, further including:
generating an output file having a format that is compatible with the spreadsheet program, the output file comprising at least information collected from said generated one or more user interfaces, data models or workflow models or combination thereof.

27. The method of claim 10, wherein the text written in said text-based language can be used without modifications on a plurality of different spreadsheet program platforms.

28. The method of claim 10, wherein the text written in said text-based language can be used without modifications on a plurality of different spreadsheet program platforms, the text being translated into a plurality of different programming languages native respectively to the plurality of different spreadsheet program platforms.

29. The method of claim 10, wherein the interpreter is further operable to generate an output file having a format that is compatible with the spreadsheet program, the output file comprising at least information collected from said generated one or more user interfaces, data models or workflow models or combination thereof.

30. The system of claim 21, wherein the text written in said text-based language can be used without modifications on a plurality of different spreadsheet program platforms.

31. The system of claim 21, wherein the text written in said text-based language can be used without modifications on a plurality of different spreadsheet program platforms, the text being translated into a plurality of different programming languages native respectively to the plurality of different spreadsheet program platforms.

32. The system of claim 21, wherein the interpreter is further operable to generate an output file having a format that is compatible with the spreadsheet program, the output file comprising at least information collected from said generated one or more user interfaces, data models or workflow models or combination thereof.

33. A program storage device readable by a machine, tangibly embodying a program of instructions executable by the machine to perform a method of platform-independent, script-based application generation for spreadsheet software, comprising:
reading from one or more spreadsheets rendered by a spreadsheet program, description written in said text-based language, the text-based language for describing user interfaces, data models or workflow models or combinations thereof, the text-based language being independent of the spreadsheet program, the description input directly into row and column cells of the one or more spreadsheets;
parsing the description;
translating the parsed description into programming instructions in a language native to the spreadsheet program based on row and column cell structure provided by the spreadsheet program;
generating one or more user interfaces, data model or workflow model or combinations thereof from the parsed description; and
presenting said one or more user interfaces, data models or workflow models or combination thereof in the spreadsheet program by executing the translated programming instructions in the spreadsheet program.

34. A program storage device readable by a machine, tangibly embodying a program of instructions executable by the machine to perform a method of platform-independent, script-based application generation for spreadsheet software, comprising:
providing a text-based language for describing user interfaces, data models or workflow models or combinations thereof, text of the text-based language being enterable directly in row and column cells of one or more spreadsheets of a spreadsheet program, the text-based language being independent of the spreadsheet program; and
providing an interpreter that parses the text and translates the text into programming instructions in a language native to the spreadsheet program based on row and column cell structure provided by the spreadsheet program, the programming instructions for generating one or more user interfaces, data models or workflow models or combination thereof specified by the text, said one or more user interfaces, data models or workflow models or combination thereof being generated and presented in the spreadsheet program by executing the translated programming instructions in the spreadsheet program.

35. The program storage device of claim 34, wherein the text written in said text-based language can be used without modifications on a plurality of different spreadsheet program platforms, the text being translated into a plurality of different programming languages native respectively to the plurality of different spreadsheet program platforms.

* * * * *